US008225145B2

(12) United States Patent
Tajima

(10) Patent No.: US 8,225,145 B2
(45) Date of Patent: Jul. 17, 2012

(54) INFORMATION PROCESSING APPARATUS AND DIAGNOSIS RESULT NOTIFYING METHOD

(75) Inventor: Takeshi Tajima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/614,250

(22) Filed: Nov. 6, 2009

(65) Prior Publication Data

US 2010/0153789 A1 Jun. 17, 2010

(30) Foreign Application Priority Data

Dec. 11, 2008 (JP) .................. 2008-315902

(51) Int. Cl.
G06F 11/00 (2006.01)
(52) U.S. Cl. ........................... 714/57; 714/46
(58) Field of Classification Search .............. 714/46, 714/48, 52, 57
See application file for complete search history.

(56) References Cited

U.S. PATENT DOCUMENTS

| 6,754,854 | B2 * | 6/2004 | Kurrasch | 714/47 |
|---|---|---|---|---|
| 6,915,461 | B1 * | 7/2005 | Watanabe | 714/57 |
| 6,966,014 | B2 * | 11/2005 | Ueoka et al. | 714/46 |
| 7,793,164 | B2 * | 9/2010 | Smith | 714/52 |
| 2002/0033946 | A1 * | 3/2002 | Thompson | 356/394 |
| 2003/0046434 | A1 * | 3/2003 | Flanagin et al. | 709/248 |
| 2004/0078689 | A1 * | 4/2004 | Knuutila et al. | 714/38 |
| 2005/0076052 | A1 * | 4/2005 | Kojima | 707/102 |
| 2006/0241936 | A1 * | 10/2006 | Katae | 704/6 |
| 2007/0168758 | A1 * | 7/2007 | Kolb et al. | 714/46 |
| 2007/0226581 | A1 * | 9/2007 | Smith | 714/758 |
| 2008/0063226 | A1 * | 3/2008 | Koyama et al. | 381/306 |
| 2009/0013208 | A1 * | 1/2009 | DiMuzio | 714/2 |

FOREIGN PATENT DOCUMENTS

| JP | UM 3056578 | 2/1999 |
|---|---|---|
| JP | 2001-2996988 | 10/2001 |
| JP | 2003-162429 | 6/2003 |
| JP | 2004-265317 | 9/2004 |
| JP | 2005-259632 | 9/2005 |
| JP | 2006-011156 | 1/2006 |
| JP | 2006-039912 | 2/2006 |
| JP | 2007-122429 A | 5/2007 |
| JP | 4152359 B | 7/2008 |

OTHER PUBLICATIONS

Agata, Web+DB Press, Apr. 24, 2008, pp. 134-142, vol. 44, Japan.
Japanese Office Action dated Feb. 2, 2010 for Japanese Application No. 2008-315902.
Japanese Office Action dated May 25, 2010 for Japanese Application No. 2008-315902.
Japanese Office Action dated Jan. 10, 2012 for Japanese Application No. 2010-186674.

* cited by examiner

Primary Examiner — Robert W Beausoliel, Jr.
Assistant Examiner — Elmira Mehrmanesh
(74) Attorney, Agent, or Firm — Knobbe, Martens, Olson & Bear, LLP

(57) ABSTRACT

According to an aspect of the present invention, there is provided an information processing apparatus including: a display unit; an information generating module configured to generate, based on a first error code that represents an internal state of the information processing apparatus, a second error code that is more acknowledgeable to a user as compared with the first error code; and a display controller configured to control the display unit to display the second error code so as to allow the user to dictate the internal state of the information processing apparatus by use of the second error code.

16 Claims, 3 Drawing Sheets

INFORMATION PROCESSING APPARATUS AND DIAGNOSIS RESULT NOTIFYING METHOD

CROSS-REFERENCE TO RELATED APPLICATIONS

This application is based upon and claims the benefit of priority from Japanese Patent Application No. 2008-315902, filed on Dec. 11, 2008, the entire contents of which are incorporated herein by reference.

BACKGROUND

1. Field

An aspect of the present invention relates to a method of communicating a fault situation of an information processing apparatus such as a PC (Personal Computer), and more particularly to a diagnosis result notifying method of communicating a fault situation orally.

2. Description of the Related Art

Recently, an apparatus capable of performing an advanced information processing has been popularized to even an ordinary family which is not a specialist in an information system. In particular, multifunctional household appliances, for example, a PC and a digital television have been popularized remarkably. In case of the PC, generally, hardware, an OS and software are manufactured by separate manufacturers respectively or a user additionally provides optional products sold separately by other manufactures.

On the other hand, since various fault factors are supposed due to the progress of multifunction or diversity, if a fault occurs, it is difficult for a user to solve the fault. In view of a user convenience for a customer of a product such as a PC, and in view of a duty of a manufacturer, a call center capable of responding to an inquiry from the user is prepared.

However, the user is not always familiar with an ICT (Information Communication Technology) and neither is an operator in the call center for receiving an inquiry. In this case, for example, when an error presently occurring is simply communicated, it is hard to grasp an accurate cause, and a miscommunication might be caused. As a result, user satisfaction is impaired.

For example, there has been proposed a remote failure diagnosing system in which state information is displayed in a two-dimensional barcode and a human dictation is removed in order to prevent an error through an oral information communication from occurring (see JP-2004-265317-A). In this case, there are required an apparatus for reading a barcode and an apparatus for communicating the barcode to a call center. A user purchasing household appliances such as a PC does not always have such apparatuses. Further, when the apparatuses are offered to the user together with the household appliances, a cost is increased and the apparatuses are not generally suitable for an ordinary family.

It has been desired to employ a method of precisely communicating a fault situation without a mistake by a person other than a specialist in an ICT for a product user support for an ordinary family.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided an information processing apparatus including: a display unit; an information generating module configured to generate, based on a first error code that represents an internal state of the information processing apparatus, a second error code that is more acknowledgeable to a user as compared with the first error code; and a display controller configured to control the display unit to display the second error code so as to allow the user to dictate the internal state of the information processing apparatus by use of the second error code.

Figure 1:
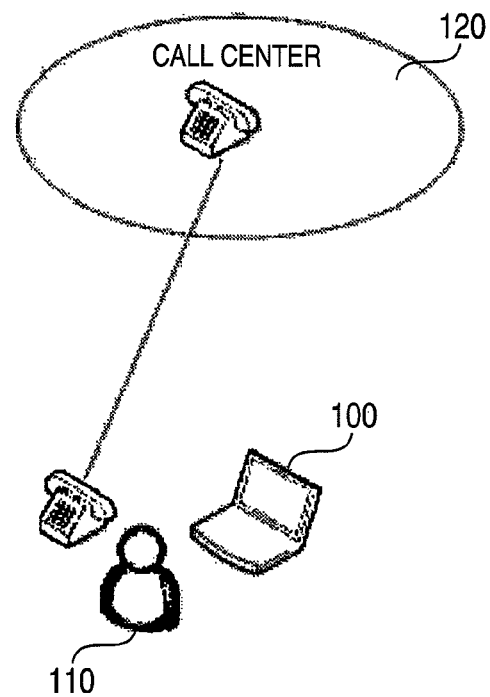
FIG. 1 is an exemplary view illustrating a diagnosis result notifying system according to the embodiment.

FIG. 1 is an exemplary view showing a diagnosis result notifying system according to the embodiment. FIG. 1 shows a PC 100, a user 110 and a call center 120.

The PC 100 is a notebook computer, for example. In recent years, there is sold a personal computer in which various functions are previously installed, for a convenience of user. As a result, for example, when the personal computer does not operate as intended, it is difficult to specify the cause of the phenomenon. Further, although an error code may be displayed when such error occur, generally, there is merely displayed apparently meaningless character strings or unfamiliar technical terms.

As the function increases, a manipulation becomes complicated. Consequently, there is a tendency that it is hard for a user to explain or reproduce which manipulation causes a fault.

The user 110 who has pursed the PC 100 is a customer of an ordinary family. A user in an ordinary family can easily purchase a PC or a digital television having a multifunction and a high performance, and usually, can utilize such high-performance apparatus without a hindrance, even though the user does not know mechanism and content thereof.

However, when the apparatus does not operate as described in a written explanation or when the unusual operation is desired to be performed, it is often hard to solve problems by the user himself/herself. Further, the problem might be caused by a latent bug. In order to enhance user satisfaction, it is desirable for a manufacturer to provide a problem solving support.

The call center 120 is a support center provided by a manufacturer of the PC 100 and has a function with which an operator can provide a support to the user of the PC 100 through a telephone. The telephonic support is advantageous in that the telephone as a communication tool is widely available for a user in an ordinary family and that the support can be provided if the PC 100 cannot function. However, an oral support is apt to cause a speech error or a mishearing. In addition, a probability of a mistake may be further increased between the persons not familiar with an ICT. This is the same for an operator working in the call center 120 in addition to the user 110. Not all of the operators are a specialist in the ICT.

It is a great proposition for the call center to enhance the customer satisfaction in the support.

Figure 2:
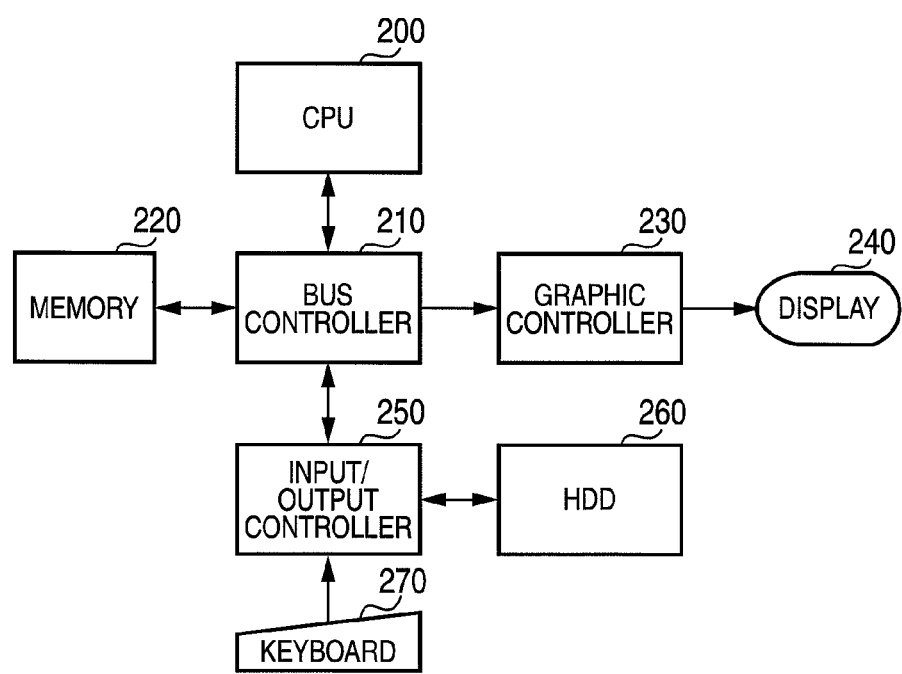
FIG. 2 is an exemplary diagram illustrating a block structure of an information processing apparatus according to the embodiment.

FIG. 2 is an exemplary diagram showing a block structure of an information processing apparatus according to the embodiment. FIG. 2 shows a CPU 200, a bus controller 210, a memory 220, a graphic controller 230, a display 240, an input/output controller 250, an HDD 260 and a keyboard 270.

The CPU 200 has a function for interpreting a program code given from an outside and executing a calculation processing and a data input/output processing.

The bus controller 210 has a function for controlling a transmission/receipt of data between components in the PC 100.

The memory 220 is an immediate writable memory which is constituted by a semiconductor memory and is used as a work area in an execution of various processings through the CPU 200, and has a relatively high speed, for example.

The graphic controller 230 has a graphic drawing function on a screen. Upon receipt of an instruction for drawing a given graphic through the CPU 200, the graphic controller 230 generates bit map information of a graphic corresponding thereto and creates image information which can be displayed on a display.

The display 240 has a function for displaying the image information created by the graphic controller 230 in a user visible state. For example, an LCD (Liquid Crystal Display) is used as the display 240.

The input/output controller 250 has a function for controlling a data input/output between the CPU 200 and an external device. Since the external device has a much lower speed than a processing speed of the CPU 200 and the accessing methods thereof are different in most cases, the input/output controller 250 is also used to take matching.

The HDD 260 is equivalent to a magnetic storage device (Hard Disk Drive). A program to be executed by the CPU 200 is prestored in the HDD 260, and is read in an execution and is thus executed.

The keyboard 270 is provided in the PC 100. The user 110 can give an instruction to the PC 100 by operating the keyboard 270.

Figure 3:
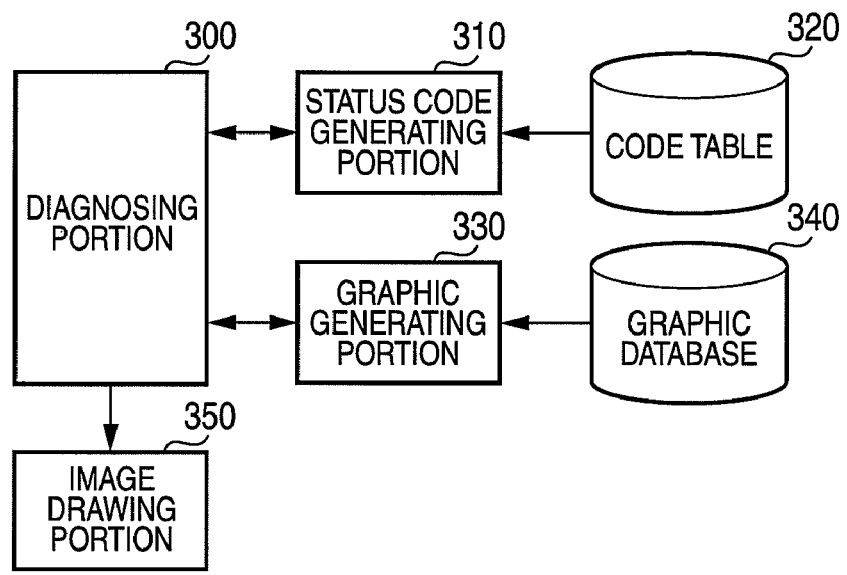
FIG. 3 is an exemplary diagram illustrating a functional block for a diagnosis result display according to the embodiment.

FIG. 3 is an exemplary diagram showing a functional block for a diagnosis result display according to the embodiment. FIG. 3 shows a diagnosing portion 300, a status code generating portion 310, a code table 320, a graphic generating portion 330, a graphic database 340 and a screen drawing portion 350.

The diagnosing portion 300 has a function for diagnosing an internal state of the PC 100. Examples of the internal state include a using status of a main memory of the PC 100, a residual capacity of the HDD 260, a failure situation of the component in the PC 100, presence of alarm information or various values set at that time. For example, if a home page cannot be browsed in a condition where a Web browser has been started inside a wireless LAN coverage area, a connection to an access point and parameter settings may be used as the internal state. When the user 110 recognizes a malfunction or an internal state which is not normal, or when the fault is automatically recognized, diagnosing portion 300 performs a diagnosis to find countermeasure for solving the fault. When acknowledging the internal state which is not normal, the diagnosing portion 300 can determine a countermeasure in accordance with a previously-supposed rule or based on a reference table of fault content and corresponding countermeasure.

The status code generating portion 310 has a function for generating a status code in which the diagnosing portion 300 corresponds to the internal state. The status code indicates a code that is obtained by replacing apparently meaningless character strings or incomprehensible technical terms with a numeral or a character string that are easily called and interpreted. This includes a name of the ordinary thing and a numeral or a character string which can be heard easily and hardly generates a mishearing. As the former case, an ordinary thing, such as a fruit, a vehicle, an animal, a weather and a playing card, which has a name familiar with everybody is applied. It is possible to minimize a communication error by altering a difficult error code into a name known by everybody. The ordinary thing indicates that a thing generally common. In the embodiment, however, it is not required to previously establish a firm and common recognition between both of them. The generality level in which actual circumstances are communicated through a certain number of communications with an operator is sufficient. As the latter case, for example, numerals are arranged to have an intonation which can easily be uttered. As an example, with respect to a significant digit sequence of "38", a digit sequence having six numerals of "383838" obtained by repeating "38" three times may be provided. By constituting the numerals according to a given rule, the speaker-side errors can be decreased as compared with a case where meaningless character string is used, and by taking the repetition into rule, the listener-side error can be prevented.

In consideration of an oral notice to the call center 120, alphabets which are hard to hear may not used for a name to be employed. For example, in case of Japanese, "2" (pronunciation in Japanese: Ni) and "4" (pronunciation in Japanese: Shi) may not be used. For example, in case of English, "B", "D", "G" and "Z" may not be used. By further taking such fact into the consideration, it is possible to further reduce the communication errors.

The code table 320 is a database in a table format which stores a status code corresponding to the internal state diagnosed by the diagnosing portion 300.

The graphic generating portion 330 has a function for specifically generating, for example, a graphic image from a name of the ordinary thing of the status code. For instance, an image of an apple is generated for the status code "apple", an image of an elephant is generated for the status code "elephant", and an image of the king of spades of a playing card is generated for the status code "the king of spades". An image of the ordinary thing is presented more intuitively than a character, and a misrecognition is expected to be hardly caused for the user 110 seeing the image.

The graphic database 340 stores image information about a graphic corresponding to the internal state diagnosed by the diagnosing portion 300.

The image drawing portion 350 has a function for drawing an image displayed on the display 240 based on the status code generated by the status code generating portion 310 and the graphic information generated by the graphic generating portion 330 in accordance with an instruction given from the diagnosing portion 300. At this time, the status code and the graphic information have a complementary relationship. Therefore, it is sufficient to simply draw one of the information.

It is desirable to adapt things classified into a single concept as the status code. For example, if the "fruit" and the "vehicle" are mixed and defined incoherently, a hearing side, that is, the operator of the call center 120 might be confused. In order to implement the corresponding relationship, it is necessary to appropriately select the group to which things sufficiently cover the number of the assumed status codes are belonged. As such group, a playing card can be selected. Subsequently, description will be given to the playing card as an example.

Figure 4:
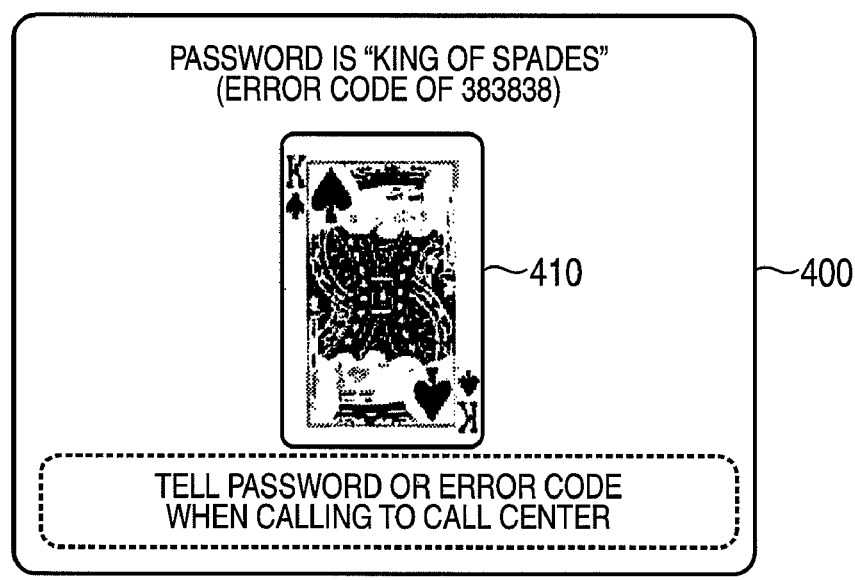
FIG. 4 is an exemplary view illustrating a diagnosis result display screen according to the embodiment.

FIG. 4 illustrates a diagnosis result display screen 400 according to the embodiment.

When the diagnosing portion 300 decides that a presentation is required for the user, the illustrated diagnosis result display screen 400 is displayed. A password of "the king of spades", an error code of "383838" corresponding thereto and a playing card 410 are displayed on the screen 400. In this case, the password of "the king of spades" corresponds to a name, the error code of "383838" corresponds to a status code, and the playing card 410 corresponds to graphic information.

When calling to the call center 120, the user 110 seeing the screen 400 can accurately inform the operator of the previously-assumed internal state of the PC 100 by simply telling any of the password, the error code and the playing card 410 which are displayed on the screen 400.

As described above, the password, the error code and the playing card 410 are obtained by altering the same internal state into respective things. As long as at least one of them is displayed on the screen 400, therefore, it is possible to obtain the same advantage.

Figure 5:
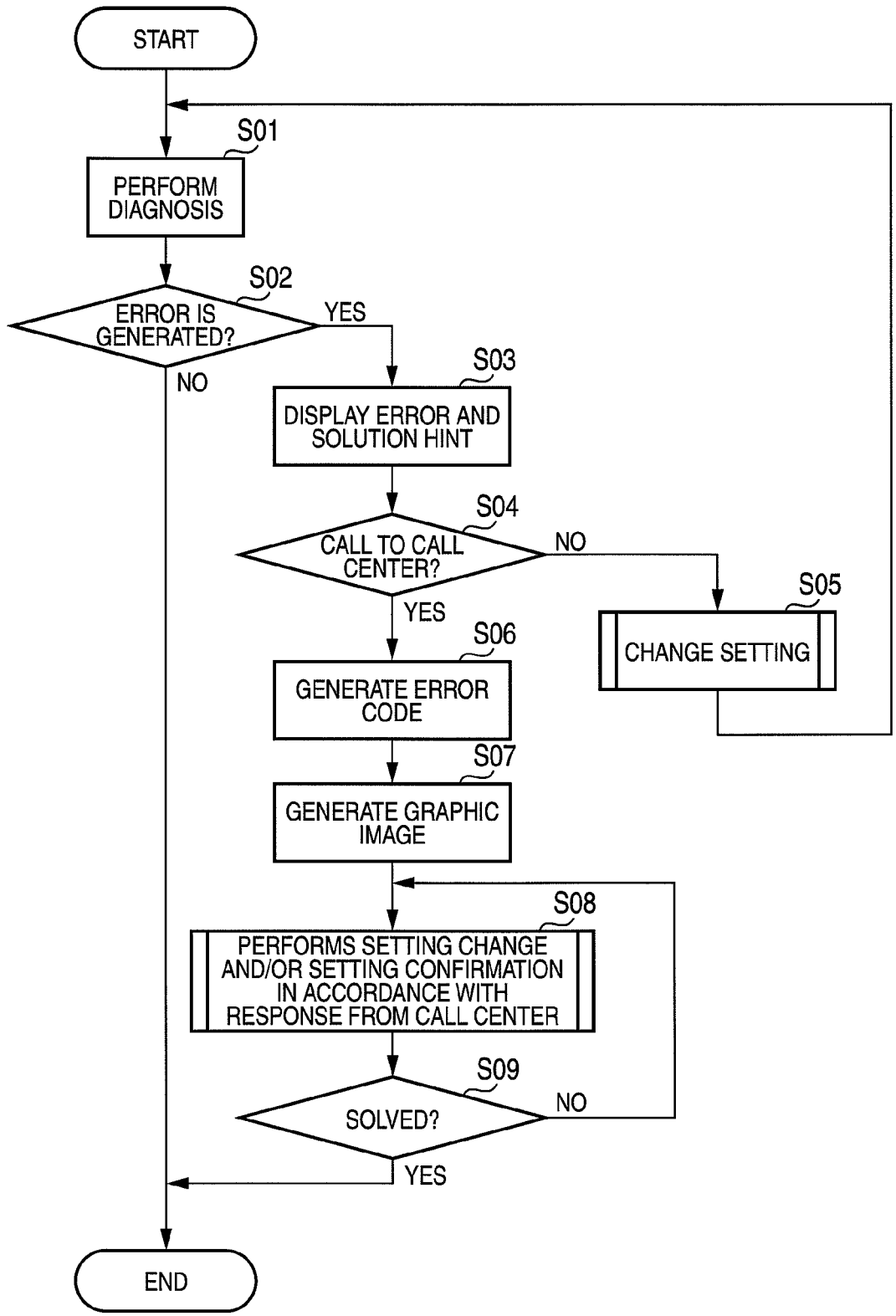
FIG. 5 is an exemplary flowchart illustrating a diagnosis result display function according to the embodiment.

FIG. 5 is an exemplary flowchart illustrating a diagnosis result display function according to the embodiment.

First of all, the diagnosing portion 300 starts to diagnose the PC 100 manually in accordance with an instruction of the user 110 or automatically (Step S01).

As a result of the diagnosis, it is decided whether any fault is caused or not (Step S02). If the fault is not observed (No), the flow is ended.

If it is decided that the fault is caused at the Step S02 (Yes), the diagnosing portion 300 displays, for the user 110, a fact that an error is generated and a hint for solving the error if available (Step S03).

The user 110 seeing the display decides whether a request for a support is given to the call center 120 depending on whether the user 110 can solve by himself/herself (Step S04). If the user 110 can solve by himself/herself (No), a parameter is corrected, changed and reset depending on the hint displayed at the Step S03 (Step S05). After the change of the setting is performed, the diagnosis is performed again to ascertain whether the fault is eliminated or not (Step S01).

If the user 110 decides to request a support of the call center 120 at the Step S04 (Yes), the user 110 gives an instruction to the PC 100 so that the status code generating portion 310 generates a name and a status code if necessary (Step S06). Next, the graphic generating portion 330 generates an image from corresponding graphic information to the internal state of the PC 100 (Step S07) and displays the image 400 as shown in FIG. 4 which presents the generated information on the display 240, for example.

Upon receipt of the image 400, the user 110 calls to the call center 120 and tells the information displayed on the screen, and furthermore, performs a setting confirmation or a setting change in accordance with an instruction from the call center 120 if any (Step S08). If the fault cannot be solved through the communication (No in the Step S09), the user 110 requests a support to the call center 120 again. On the other hand, if the fault is solved (Yes in the Step S09), the flow is ended.

By the structure, it is possible to minimize a mixture of a communication error also in an oral support through a telephone line.

The invention is not restricted to the embodiment but the component can be changed and made concrete without departing from the scope thereof in an executing stage. Moreover, various inventions can be formed in a proper combination of the components disclosed in the embodiment. For example, it is also possible to delete some of all the components described in the embodiment. Furthermore, it is also possible to properly combine components according to different embodiments.

It is possible to provide an information processing apparatus and a diagnosis result notifying method which can minimize a mixture of a communication error also in an oral support through a telephone line.

What is claimed is:

1. An information processing apparatus comprising:
a display;
an information generator configured to generate, based on a first error code that represents an internal state of the information processing apparatus comprising a first character string which is not a member of a set with a meaning in a selected language, a second error code configured to be more objectively recognizable to an average user as compared with the first error code; and
a display controller configured to control the display to display the second error code indicative of the internal state of the information processing apparatus,
wherein the second error code comprises a second character string which is a member of a set with a meaning in the selected language.

2. The information processing apparatus according to claim 1,
wherein the display controller is configured to display an image comprising objects corresponding with the second error code.

3. The information processing apparatus of claim 1, wherein the second character string of the second error code consists of numeric characters.

4. The information processing apparatus of claim 1, wherein the second character string of the second error code consists of alphabetic characters.

5. An information processing apparatus comprising:
a display;
an information generator configured to generate, based on a first error code that represents an internal state of the information processing apparatus comprising a first character string which is not a member of a set with a meaning in a selected language, a second error code configured to be more objectively recognizable to an average user as compared with the first error code; and
a display controller configured to control the display to display the second error code indicative of the internal state of the information processing apparatus,
wherein the second error code comprises a second character string generated in accordance with a predetermined rule configured to be recognized by the user and configured to avoid characters which are difficult to audibly distinguish from other characters.

6. The information processing apparatus of claim 5,
wherein the second error code comprising a repetitive combination of two characters corresponding to the internal state is generated by the predetermined rule.

7. The information processing apparatus of claim 5, wherein the second character string consists of numeric characters.

8. The information processing apparatus of claim 4, wherein the second character string consists of alphabetic characters.

9. A method for notifying a diagnosis result, the method comprising:
- diagnosing an internal state of an information processing apparatus thereby outputting a first error code indicative of the internal state, the first error code comprising a first character string which is not a member of a set with a meaning in a selected language;
- generating a second error code based on the first error code; and
- displaying the second error code on a display of the information processing apparatus in order to indicate the internal state of the information processing apparatus,
- wherein the second error code comprises a second character string which is a member of a set with a meaning in the selected language.

10. The method of claim 9, further comprising displaying an image comprising objects corresponding with the second error code.

11. The method of claim 9, wherein the second character string of the second error code consists of numeric characters.

12. The method of claim 7, wherein the second character string of the second error code consists of alphabetic characters.

13. A method for notifying a diagnosis result, the method comprising:
- diagnosing an internal state of an information processing apparatus thereby outputting a first error code indicative of the internal state, the first error code comprising a first character string which is not a member of a set with a meaning in a selected language;
- generating a second error code based on the first error code; and
- displaying the second error code on a display of the information processing apparatus in order to indicate the internal state of the information processing apparatus,
- wherein the second error code comprises a second character string generated in accordance with a predetermined rule configured to be recognized by a user and configured to avoid characters which are difficult to audibly distinguish from other characters.

14. The method of claim 13,
- wherein the second error code comprises a repetitive combination of the two characters corresponding to the internal state is generated by the predetermined rule.

15. The method of claim 13, wherein the second character string consists of numeric characters.

16. The method of claim 13, wherein the second character string consists of alphabetic characters.

* * * * *